US006973069B1

(12) United States Patent
Spear et al.

(10) Patent No.: US 6,973,069 B1
(45) Date of Patent: Dec. 6, 2005

(54) METHOD FOR TRANSPORTING MULTIMEDIA INFORMATION IN A COMMUNICATION SYSTEM

(75) Inventors: Stephen Lee Spear, Skokie, IL (US); Sanjay Gupta, Chicago, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/274,941

(22) Filed: Mar. 23, 1999

(51) Int. Cl.[7] .............................. H04B 7/00; H04J 3/16
(52) U.S. Cl. ...................... 370/342; 370/343; 370/345; 370/466; 370/493
(58) Field of Search ................................ 370/349, 352, 370/389, 392, 400, 401, 465, 466, 469, 493, 370/328, 338, 535, 538, 487, 329, 341, 342, 370/343, 345, 353, 354, 395.21, 431, 432, 370/437, 473

(56) References Cited

U.S. PATENT DOCUMENTS

| 5,502,573 | A | * | 3/1996 | Fujinami ...................... 386/65 |
| 5,768,533 | A | * | 6/1998 | Ran ........................... 709/247 |
| 6,130,883 | A | * | 10/2000 | Spear et al. ................. 370/328 |
| 6,160,804 | A | * | 12/2000 | Ahmed et al. ............... 370/349 |
| 6,167,040 | A | * | 12/2000 | Haeggstrom ................ 370/352 |
| 6,243,371 | B1 | * | 6/2001 | Chawla et al. .............. 370/347 |
| 6,272,129 | B1 | * | 8/2001 | Dynarski et al. ........... 370/356 |
| 6,295,302 | B1 | * | 9/2001 | Hellwig et al. ............. 370/345 |
| 6,370,666 | B1 | * | 4/2002 | Lou et al. .................... 714/751 |
| 6,477,670 | B1 | * | 11/2002 | Ahmadvand ................ 714/712 |

FOREIGN PATENT DOCUMENTS

WO    WO 99/05828 A    2/1999

OTHER PUBLICATIONS

J. Rosenberg, H Schultzrinne: "An A/V Profile Extension ofr Generic Forward Error Correction in RTP", Internet Engineering Task Force, Online!, Jul. 1, 1997, Retrieved from the Internet: URL:http://www.waterspings.org/pub/id/draft-ietf-avt-info-repair-oo.txt>.

Perkins C et al.: "Options for Repair of Streaming Media", IETF Request for Comments, xx, xx, Jun. 1998.

* cited by examiner

*Primary Examiner*—Ricky Ngo
*Assistant Examiner*—Soon D. Hyun
(74) *Attorney, Agent, or Firm*—John B. MacIntyre; Steven A. May

(57) ABSTRACT

The present invention provides a method for transporting multimedia information in a communication system. A plurality of streams are received. The streams together form a multimedia session. The plurality of streams are decoded, based upon the content of each individual stream, to form a plurality of decoded streams. Layer 2 functionality is performed upon each of the plurality of decoded streams.

23 Claims, 3 Drawing Sheets

-- PRIOR ART --

METHOD FOR TRANSPORTING MULTIMEDIA INFORMATION IN A COMMUNICATION SYSTEM

FIELD OF THE INVENTION

The invention relates generally to communication systems, and more particularly to a method for transporting multimedia information in a communication system.

BACKGROUND OF THE INVENTION

Multimedia communications involves simultaneous use of one or more media services, such as voice, video, and data, in a single communication session. Recently, a number of standards, such as H.323, have been defined that address the requirements for multimedia communications in a wireline packet switched network. Recently GPRS, a packet switched network overlaid on the existing GSM (Global System for Mobile Communications) network, has been standardized by the European Telecommunications Standards Institute (ETSI).

Given the above trends in the wireline and wireless communications, there is an increased desire to support multimedia applications in wireless cellular networks. Further, in the interest of fixed-mobile convergence, there is an emphasis on employing, or reusing as much as possible, existing wireline protocols for wireless networking applications.

There are various problems associated that necessitate the use of middle-ware for multimedia applications in wireless applications. As used herein, the term middleware refers to software or firmware in a layered architecture that provides tools to application software to better utilize the lower layers. In wireline applications, traffic from the various component media streams are treated the same. However, in wireless networks, different media streams must be treated differently for optimum performance. For instance, the channel coding used is usually dependent on the media being transported. Further, different Quality of Service (QoS) objectives may be suited for different traffic streams. For example, voice codecs (coder/decoder) may be more resilient to errors than video codecs.

Wireless environments are typically poorer, when compared to wireline transmission channels, and further difficulties arise due to channel error characteristics changing rapidly. Transport protocols, such as the Transmission Control Protocol (TCP), in wireline networks are tailored for the relatively error-free wireline environment and are unlikely to perform as desired in wireless environments.

As an example of current multimedia applications, FIG. 1 depicts a multimedia application 100 in accordance with the prior art. Multimedia application 100 includes a voice coder (vocoder) 105 and a video coder 106. A voice signal 103 is input into vocoder 105, which performs voice coding functionality and passes the coded voice signal to multiplexor (Mux) 107. A video signal 104 is input into video coder 106, which performs video coding on the signal and passed the coded signal to mux 107. A data signal 108 is input into mux 107. Multiplexor 107 performs multiplexing operations on the signals, as is well-known in the art, and sends the multiplexed signal to channel coder 109. Channel coder 109 codes the multiplexed signal and sends the signal to pipe 110. It should be realized that the coded signal sent to pipe 110 is a combined signal that includes a voice portion, a video portion, and a data portion.

When receiving a signal, multimedia application 100 receives a coded signal at pipe 110. Pipe 110 passes the signal to channel decoder 111, which decodes the signal and sends the signal to demultiplexor 113. Demux 113 demultiplexes the signal, and sends component portions of the signal to an appropriate decoder. A voice component is sent to voice decoder 115, which performs decoding operations on the signal and outputs a decoded voice signal 119. Demux 113 sends the video portion of the signal to video decoder 117, which decodes the signal and outputs a video signal 121. Demux 113 outputs a data signal 123.

The overhead associated with wireline protocols is significant, especially when used as-is over currently defined wireless packet networking protocol stacks. This renders their use over scarce wireless transmission capacity a liability.

In short, the multimedia applications of today are designed such that the lower layer protocols, Layer 1, Layer 2, and Layer 3, are not aware of the contents of the data they transfer. As used herein, Layer 2 (L2) provides functionality for error detection and correction including any retransmission of packets. Given the unpredictable nature of wireless channels, it is essential that the lower layers be tailored to meet the specific demands of the various traffic types.

Thus, a need exists for a method for sending and receiving multimedia information in a communication system.

DETAILED DESCRIPTION OF A PREFERRED EMBODIMENT

The present invention provides a method for transporting, via transmitting and receiving, multimedia information in a communication system. The method includes the steps of receiving, preferably over the air, a plurality of streams that together form a multimedia session. The plurality of streams are then decoded, based upon the content of each individual stream, to form a plurality of decoded streams. Layer 2 functionality is then performed upon each of the plurality of decoded streams.

Figure 1:
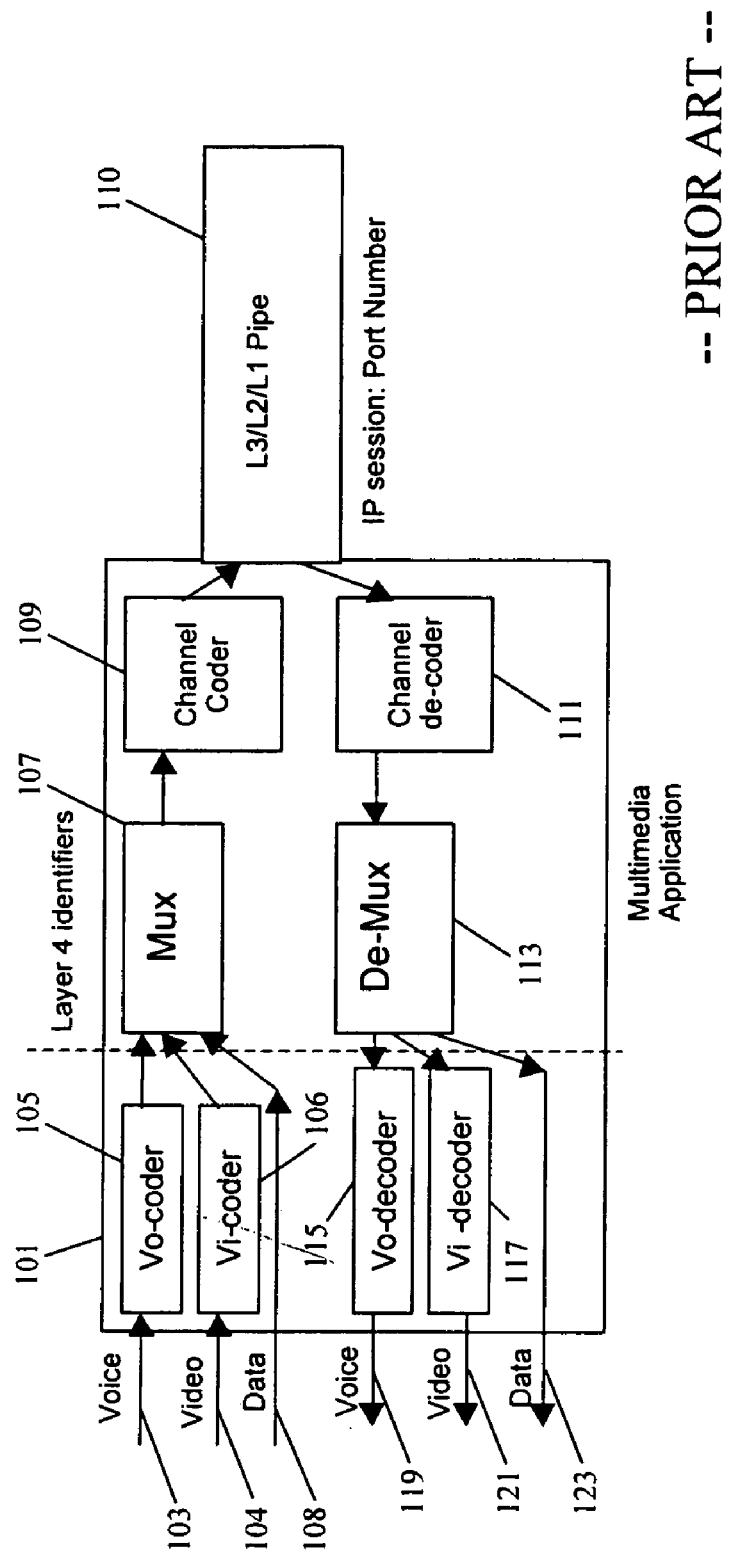
FIG. 1 depicts an architectural representation of a multimedia application in accordance with the prior art.
Figure 2:
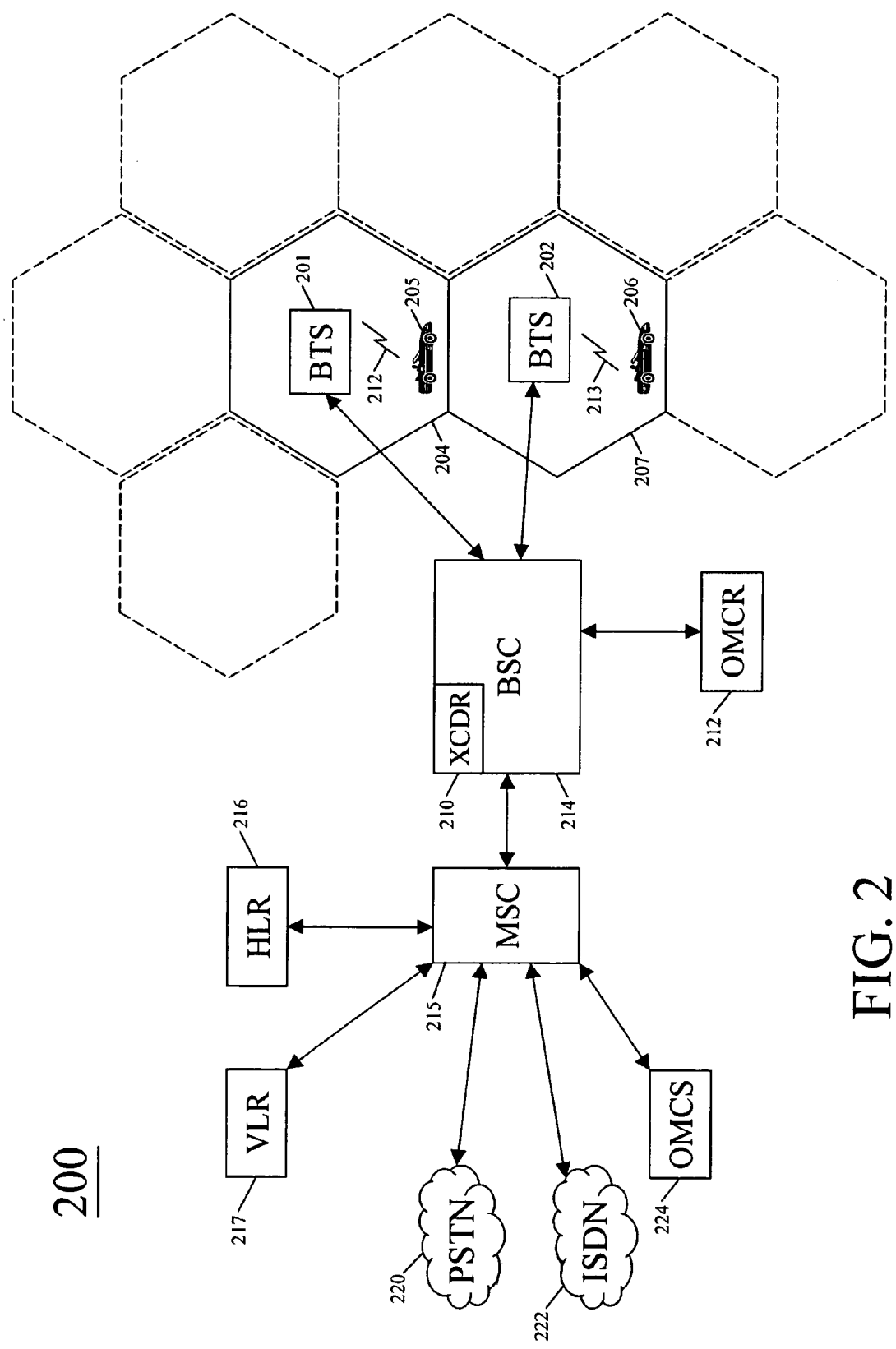
FIG. 2 depicts a communication system in accordance with the preferred embodiment of the present invention.
Figure 3:
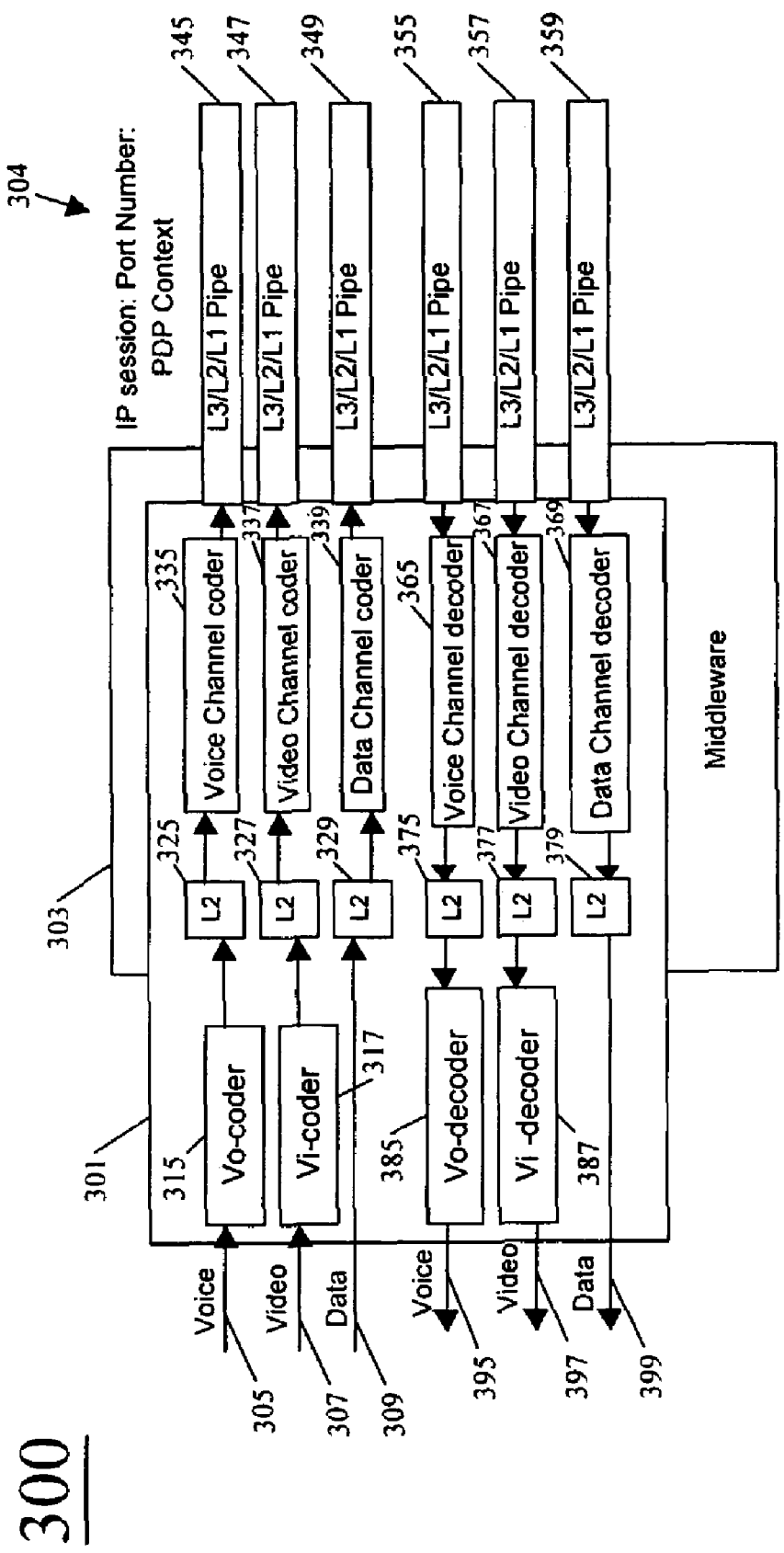
FIG. 3 depicts an architectural representation of a multimedia application in accordance with the preferred embodiment of the present invention.

The present invention can be better understood with reference to FIGS. 2 and 3. Referring now to FIG. 2, a Global System for Mobile communications (GSM) communication system 200 in accordance with the preferred embodiment of the present invention is depicted. Communication system 200 is preferably a GSM system, but could alternately be any digital communication system that processes multimedia streams, such as PDC, Advanced Mobile Phone Service (AMPS), United States Time Division Multiple Access (US-TDMA), Code Division Multiple Access (CDMA), or any other suitable communication system. Referring to FIG. 2, acronyms are used for convenience. The following is a list of the acronyms used in FIG. 2:

BTS Base Transceiver Station
BSC Base Station Controller
GSM Global System for Mobile communications
HLR Home Location Register
ISDN Integrated Services Digital Network MS Mobile Station
MSC Mobile Switching Center
OMCR Operations and Maintenance Center-Radio
OMCS Operations and Maintenance Center-Switch
PSTN Public Switched Telephone Network
VLR Visitor Location Register
XCDR Transcoder A first base transceiver station (BTS) 201 is located in a first coverage area 204 and communicates with a mobile station 205. Mobile station 205 can be a mobile unit, a remote unit, a fixed wireless terminal, or any other unit capable of sending or receiving RF communications to or from first BTS 201, and more particularly, that is able to send multimedia information. As used herein, multimedia information refers to information that includes at least two of different types of information, such as voice, video, or data. Communication is via a first digital radio channel 212 that contains data information compatible with a GSM communication system.

Mobile station 206 communicates with second BTS 202 that is located in second coverage area 207. Communication is via a second digital radio channel 213 that contains data information compatible with a GSM communication system. Base transceiver stations 201 and 202 can include multiple channels.

Also included in FIG. 2 is base transceiver station 202 located within coverage area 207. BTSs 201 and 202 are each coupled to a base station controller (BSC) 214 which includes an XCDR 210. XCDR 210 routes the speech information to and from the base transceiver stations 201 and 202. The speech information is routed to an MSC 215 which provides switching functions for access to PSTN 220 or ISDN 222. Home Location Registry (HLR) 216 and Visitor Location Registry (VLR) 217 provide location and billing services for the entire system as is well known in the art, while OMCS 224 and OMCR 212 provide diagnostics and maintenance services for the entire system, as is also well known in the art.

Mobile stations 205 and 206 each preferably include a receiver, a transmitter, a processor, and memory. The receiver receives information from BTSs 201 and 202, respectively, via first channel 212 and second channel 213, respectively. The transmitters transmit information to first base station 201 and second base station 202, respectively. The processors update variables pertaining to mobile stations 205 and 206 based at least in part upon the information received from BTSs 201 and 202. The memory stores information related to mobile stations 205 and 206.

FIG. 3 depicts an architectural representation of a multimedia application 300 in accordance with the preferred embodiment of the present invention. Multimedia application 300 preferably runs in a mobile station and a base station, but can alternately run in a BSS, a BSC, or any other network element that is capable of sending and receiving multimedia information. Multimedia application 300 includes a codec 301, middleware 303, and output ports 304.

Codec 301 preferably includes matched pairs of coders and decoders. In the preferred embodiment as depicted in FIG. 3, codec 301 includes a voice coder (vocoder) 315, a voice channel coder 335, a voice channel decoder 365, and a voice decoder 385. Codec 301 also preferably includes a video coder 317, a video channel coder 337, a video channel decoder 367, and a video decoder 387. In the preferred embodiment as depicted in FIG. 3, codec 301 also includes a data channel coder 339 and a data channel decoder 369.

Middleware 303 includes signaling functionality between each coder and channel coder. Middleware 303 includes, in the preferred embodiment, L2 functionality 325, L2 functionality 327, L2 functionality 329, L2 functionality 375, L2 functionality 377, and L2 functionality 379. L2 325, L2 327, and L2 329 replace the functionality of the multiplexor in prior art systems.

In prior art systems, the output from a vocoder, a video coder, and any data is sent to a multiplexor, which combines the data and sends the multiplexed data to a channel coder. In the present invention, voice signal 305 is sent to vocoder 315 and video signal 307 is sent to video coder 317, as in the prior art. Vocoder 315 codes the voice, as is well-known in the art, and video coder 317 codes the video signal, as is well-known in the art. Rather than send the coded signals to a multiplexor, as in the prior art, the present invention sends the coded signals, along with any other data signal, to middleware 303. Middleware 303 keeps the component media streams separated during transport. In this manner, optimal header compression occurs for each stream, and channel coding is performed on the stream specific to the source of the stream.

Signals 305, 307, and 309 can be originated from a computer connected to a mobile station that includes multimedia application 300. These signals may be in their component types when leaving the computer, or may be multiplexed by the computer. In this situation, the multiplexed signal first passes through a demultiplexor that splits the signal into its component multimedia parts.

L2 functionality 325 transports the received coded voice stream to first voice channel coder 335. L2 functionality 327 transports the received coded video stream to a first video channel coder 337. L2 functionality 329 sends any received data stream to first data channel coder 339. In this manner, each different multimedia stream is preferably sent to a different coder. This improves over the prior art, which combines all inputs and send them to a single channel coder. By keeping the multimedia streams separated, optimal coding can be performed on each different type of multimedia stream.

Coders 335, 337, and 339 each perform channel coding on the input stream, as is known in the art. The output of each of these channel coders is then sent to output ports 304. Output ports 304 include pipes 345, 347, 349, 355, 357, and 359. Each pipe is preferably connected to a transceiver that facilitates over the air communication between elements in a wireless communication system.

As an example of the preferred method of operation of the present invention, a multimedia stream, comprised of voice stream 305, video stream 307, and data stream 309, originates at multimedia application 300. Voice stream 305 is sent to vocoder 315, which performs appropriate voice coding and sends the coded voice signal to L2 functionality 325 located within middleware 303. Video stream 307 is sent to video coder 317, which performs appropriate coding thereon. The coded video stream is the sent to L2 functionality 327 within middleware 303. Data stream 309 is sent to L2 functionality 329 within middleware 303.

L2 functionality 325 sends the coded voice signal to voice channel coder 335. Voice channel coder 335 performs appropriate voice channel coding on the coded voice signal, and sends the signal to its intended destination via pipe 345. L2 functionality 327 sends the coded video signal to video channel coder 337. Video channel coder 339 performs appropriate video channel coding, and sends the channel coded signal to pipe 347 for routing to its intended destination. L2 functionality 329 send the data signal to data channel coder 339, which performed appropriate data channel coding thereon. The channel coded data signal is then sent to its intended destination via pipe 349, preferably over the air.

In the preferred embodiment of the present invention, the intended destination of the signals is represented by an IP address. Each signal is kept separated by its type, such as voice, video, or data, and sent to the destination using an IP address. In this manner, the signals can be routed in the most efficient manner. For example, data signals, which are typically not extremely time-dependent, can be resent if an error is detected in the signal. Voice and video signals, which are very time-dependent, are usually not resent if an error is detected. The faulty voice or video packet is typically discarded. Using the present invention, better communications are realized by sending the packets separately, so that such adjustments, such as whether to resend messages or not, can be performed only on packets that benefit from being resent.

In a similar manner to the sending of streams, a plurality of streams are received by multimedia application 300. The plurality of streams together form a multimedia session. In the preferred embodiment, the plurality of streams are received over the air in a wireless communication system.

As an example of the preferred embodiment of the present invention, pipe 355 receives a voice signal from another multimedia application. Pipe 355 sends the signal to voice channel decoder 365 within middleware 303. Channel decoder 365 performs appropriate voice channel decoding on the stream, and sends the channel decoded stream to L2 functionality 375 within middleware 303. L2 functionality 375 chooses which packets to discard and how to fill any holes due to lost or discarded packets. L2 functionality 375 also sends the signal to voice decoder 385. Voice decoder 385 decodes the signal, and sends the decoded voice signal 395 to its ultimate destination, typically a speaker which amplifies the signal for detection by a user of a communication unit.

In a similar manner, pipe 357 receives a video signal from another multimedia application. This signal may not be associated with the voice signal received by pipe 355. The video signal is passed to video channel decoder 367, which perform appropriate video channel decoding on the stream. The decoded video stream is then sent to L2 functionality 377 within middleware 303. L2 functionality 377 sends the signal to video decoder 387, which decodes the video signal and sends the decoded video signal 397 to its ultimate destination, typically a display device for converted video signal 397 to an image for detection by a user of a communication unit.

In like fashion, a data signal is received by pipe 359, which sends the signal to data channel decoder 369. Decoder 369 decodes the signal and sends the decoded data signal to L2 functionality 39, which outputs data signal 399.

The present invention therefore provides a method for transporting multimedia information in a communication system. The present invention allows multimedia applications to be transported efficiently over wireless networks by splitting multimedia streams into component parts for transport within a communication system. The present invention allows the use of existing and forthcoming communication systems that are designed to support single media streams in wireless networks. Further, the present invention allows existing wireline multimedia standards to be used end-to-end.

The present invention provides middle-ware that provides the lower layer (L1, L2, and L3) information about the nature of the contents of the data being transported. This allows the communication system to provide service that is tailored for each data type. The middle-ware of the present invention allows the use of wireline applications on an end-to-end basis without the liabilities of the prior art.

The communication system of the present invention decides when to utilize the present invention to enter multimedia mode. As used herein, multimedia mode refers to a mode of operation wherein multimedia signals are split into at least two different types, such as voice, video, or data. This decision can be made based upon what portion of the communication sessions contain multimedia information, the capabilities of the network and mobile stations to utilize the present invention, or other decisions that would allow for optimization of the sessions. Upon deciding to enter multimedia mode, the other network components, such as the mobile station, the base station, and any computers connected to the mobile station, are alerted that multimedia mode has been entered. The decision to enter multimedia mode can be made by the mobile station, a computer connected to the mobile station, or by the network at the base station or a controller connected to the base station. Each of these elements would then alert the other elements to enter multimedia mode to begin utilizing the present invention. The other elements then begin processing multimedia streams.

While this invention has been described in terms of certain examples thereof, it is not intended that it be limited to the above description, but rather only to the extent set forth in the claims that follow.

We claim:

1. A method for receiving multimedia information in a communication system, the method comprising:
   receiving a plurality of streams, the plurality of streams which together form a multimedia session;
   decoding, based upon whether the content of each individual stream comprises one or more of audio, video, and data, the plurality of streams to form a plurality of decoded streams; and
   performing a different Layer 2 functionality upon each of the plurality of decoded streams based upon whether the content of each individual stream comprises audio, comprises video, or comprises data.

2. A method for receiving multimedia information in a communication system in accordance with claim 1, wherein the step of receiving a plurality of streams comprises the step of receiving the plurality of streams over the air.

3. A method for receiving multimedia information in a communication system in accordance with claim 1, further comprising the step of alerting a mobile station to begin processing multimedia streams.

4. A method for receiving multimedia information in a communication system in accordance with claim 1, further comprising the step of alerting a base station to begin processing multimedia streams.

5. A method for receiving multimedia information in a communication system in accordance with claim 1, further comprising the step of deciding to enter multimedia mode.

6. A method for receiving multimedia information in a communication system in accordance with claim 5, wherein the step of deciding to enter multimedia mode comprises the step of deciding to enter multimedia mode by a mobile station.

7. A method for receiving multimedia information in a communication system in accordance with claim 6, further comprising the step of alerting a computer connected to the mobile station to enter multimedia mode.

8. A method for receiving multimedia information in a communication system in accordance with claim 6, further comprising the step of alerting a network to enter multimedia mode.

9. A method for receiving multimedia information in a communication system in accordance with claim 5, wherein the step of deciding to enter multimedia mode comprises the step of deciding to enter multimedia mode by a computer connected to the mobile station.

10. A method for receiving multimedia information in a communication system in accordance with claim 9, further comprising the step of alerting a mobile station to enter multimedia mode.

11. A method for receiving multimedia information in a communication system in accordance with claim 9, further comprising the step of alerting a network to enter multimedia mode.

12. A method for receiving multimedia information in a communication system in accordance with claim 5, wherein the step of deciding to enter multimedia mode comprises the step of deciding to enter multimedia mode by a network.

13. A method for receiving multimedia information in a communication system in accordance with claim 12, further comprising the step of alerting a mobile station to enter multimedia mode.

14. A method for receiving multimedia information in a communication system in accordance with claim 12, further comprising the step of alerting a computer connected to the mobile station to enter multimedia mode.

15. A method for transmitting multimedia information in a communication system, the method comprising:
   receiving a multimedia stream at a mobile station;
   splitting the multimedia stream into component pieces at the mobile station based on whether each component piece comprises one or more of audio, video, and data;
   applying a different Layer 2 protocol to the component pieces at the mobile station based upon whether each component piece comprises audio, comprises video, or comprises data;
   applying cannel coding to the component pieces at the mobile station; and
   transmitting the component pieces from the mobile station to a base station.

16. A method for transmitting multimedia information in a communication system in accordance with claim 15, wherein the step of transmitting to a base station comprises transmitting each component piece individually to a base station.

17. A method for transmitting multimedia information in a communication system in accordance with claim 15, wherein the step of transmitting the component pieces comprises the step of transmitting the component pieces over the air.

18. A method for receiving multimedia information in a communication system, the method comprising:
   receiving a plurality of streams which together form a multimedia session;
   decoding, based upon whether the content of each individual stream comprises one or more of audio, video, and data, the plurality of decoded streams;
   performing a different Layer 2 functionality upon each of the decoded streams based upon whether the content of each individual stream comprises audio, comprises video, or comprises data; and
   combining the plurality of streams into a multimedia stream.

19. A method for receiving multimedia in accordance with claim 18, further comprising the step of sending the multimedia stream to a network.

20. A method for receiving multimedia in accordance with claim 18, wherein the step of receiving a plurality of streams comprises the step of receiving a plurality of streams over the air.

21. A method for transmitting multimedia information in a communication system, the method comprising:
   applying a different Layer 2 protocol to component pieces of a multimedia stream at a mobile station based upon whether each component piece comprises audio, comprises video, or comprises data;
   applying channel coding to the component pieces at the mobile station based on whether each component piece comprises one or more of audio, video, and data; and
   transmitting the component pieces to a base station.

22. A method for transmitting multimedia information in a communication system in accordance with claim 21, wherein the step of transmitting the component pieces to a base station comprises the step of transmitting the component pieces over the air.

23. A method for transmitting multimedia information in a communication system, the method comprising:
   receiving a multimedia stream;
   splitting the multimedia stream into component pieces based on whether each component piece comprises one or more of audio, video, and data;
   applying a different Layer 2 protocol to the component pieces based upon whether each component piece comprises audio, comprises video, or comprises data;
   applying channel coding to the component pieces; and
   transmitting over the air the component pieces to a mobile station.

* * * * *